United States Patent
Deschenes et al.

(10) Patent No.: US 10,893,234 B2
(45) Date of Patent: Jan. 12, 2021

(54) SYSTEM AND METHOD OF DYNAMIC PLAYBACK VARIATION FOR MULTIMEDIA COMMUNICATION

(71) Applicant: David Clark Company Incorporated, Worcester, MA (US)

(72) Inventors: Brad Deschenes, Dudley, MA (US); Sanjay Gupta, Bedford, MA (US); Nicholas Cannata, Sutton, MA (US)

(73) Assignee: David Clark Company Incorporated, Worcester, MA (US)

( * ) Notice: Subject to any disclaimer, the term of this patent is extended or adjusted under 35 U.S.C. 154(b) by 0 days.

(21) Appl. No.: 16/823,872

(22) Filed: Mar. 19, 2020

(65) Prior Publication Data
US 2020/0314384 A1    Oct. 1, 2020

Related U.S. Application Data

(60) Provisional application No. 62/879,693, filed on Jul. 29, 2019, provisional application No. 62/858,411, (Continued)

(51) Int. Cl.
*H04N 7/15* (2006.01)
*G11B 20/10* (2006.01)
*G11B 27/00* (2006.01)

(52) U.S. Cl.
CPC ......... *H04N 7/15* (2013.01); *G11B 20/10527* (2013.01); *G11B 27/005* (2013.01)

(58) Field of Classification Search
CPC ..... H04N 7/15; H04L 47/283; H04L 47/2416; H04L 47/30; H04L 29/06227; H04M 1/2535
(Continued)

(56) References Cited

U.S. PATENT DOCUMENTS 6,212,206 B1 * 4/2001 Ketcham ............... H04J 3/0632
                                                      348/E7.083
6,651,751 B2 * 11/2003 Kluczynski ............ A62C 13/78
                                                         169/30
(Continued)

FOREIGN PATENT DOCUMENTS

GB        2480821 A      12/2011
WO    2015105970 A1       7/2015

OTHER PUBLICATIONS

ISR and Written Opinion in corresponding PCT application No. PCT/US2020/024389 dated Jun. 12, 2020.

*Primary Examiner* — Melur Ramakrishnaiah
(74) *Attorney, Agent, or Firm* — Burns & Levinson LLP; Steven M. Mills (57) ABSTRACT

A method and system for digital data transfer includes a source entity and destination entity. The source entity is configured to send a plurality of data packets at a plurality of send times separated by transmission time intervals. The destination entity is configured to receive the data packets at a plurality of receipt times separated by receipt time intervals, populate a buffer, and playback the data packets. When the receipt time interval between the receipt times of two data packets is less than the transmission time interval between the send times of said data packets, the playback speed of the data packets is dynamically adjusted to be a faster than nominal playback speed. When the buffer is smaller than a nominal buffer size, the playback speed is dynamically adjusted to be slower than nominal playback speed.

17 Claims, 4 Drawing Sheets

Related U.S. Application Data filed on Jun. 7, 2019, provisional application No. 62/825,265, filed on Mar. 28, 2019.

(58) Field of Classification Search
USPC .......................................... 348/14.01–14.16
See application file for complete search history.

(56) References Cited

U.S. PATENT DOCUMENTS

| | | | | |
|---|---|---|---|---|
| 2003/0152093 | A1* | 8/2003 | Gupta | H04L 65/604 |
| | | | | 370/412 |
| 2004/0218626 | A1* | 11/2004 | Tyldesley | H04N 21/2385 |
| | | | | 370/464 |
| 2017/0332209 | A1 | 11/2017 | Awai | |

* cited by examiner

SYSTEM AND METHOD OF DYNAMIC PLAYBACK VARIATION FOR MULTIMEDIA COMMUNICATION

CROSS REFERENCE TO RELATED APPLICATIONS

This application claims priority to and the benefit of U.S. Provisional Patent Application No. 62/825,265, filed on Mar. 28, 2019, and titled "SYSTEM AND METHOD OF WIRELESS COMMUNICATION USING A DYNAMIC MULTICAST DISTRIBUTION SCHEME", the contents of which are incorporated herein by reference as though fully set forth herein. Further, this application claims priority to and the benefit of U.S. Provisional Patent Application No. 62/858,411, filed on Jun. 7, 2019 and titled "SYSTEM AND METHOD OF WIRELESS COMMUNICATION USING DESTINATION BASED QUEUEING", the contents of which are incorporated herein by reference as though fully set forth herein. Further, this application claims priority to and the benefit of U.S. Provisional Patent Application No. 62/879,693, filed on Jul. 29, 2019 and titled "METHOD AND SYSTEM OF DYNAMIC PLAYBACK VARIATION FOR MULTIMEDIA COMMUNICATION", the contents of which are incorporated herein by reference as though fully set forth herein.

FIELD OF THE TECHNOLOGY

The subject disclosure relates to multimedia communication systems and methods of communicating over multimedia communication systems, and more particularly to transmission of data packets between devices and playback of said data packets.

BACKGROUND OF THE TECHNOLOGY

Several systems and methods exist today for facilitating real-time communication between two or more devices. In general, during a given communication session, one device (a source entity) transmits data which is then received and played back for a user by at least one other device (a destination entity). Typically, the rate at which data packets are played back tends to match the rate at which the data packets are generated and sent at the source. Matching a playback speed to the generation and transmission rates of the data packets allows the data packets to be presented to a user at a speed that accurately reflects the real-world elapsed time from when the data packets were generated.

One problem that arises in such systems is that during a given communication session, the quality of connections between devices can fluctuate causing the time interval between successive frames received to be different from those at the source. For example, at times, the connection between source and destination entity may be poor, causing transfer of the data packets to fall behind. When the connection is restored to a good connection, the destination entity may receive a number of previously transmitted data packets in short succession as the source entity continues to transmit the previously transmitted data packets until delivery to the destination entity is successful. These attempts can sometimes occur many times before the source entity gives up any attempt at delivery. However, by the time delivery is successful, a long gap in delivery may have occurred. Further, new data packets reflecting more current media from the source entity that have been received are unable to be played back as the destination entity seeks to playback the backlogged data packets that were not received during their initial transmission from the source entity. A similar behavior may be observed due to the presence of multiple streams of data bring transported over the network.

SUMMARY OF THE TECHNOLOGY

In light of the needs described above, in at least one aspect, there is a need for a communication system and method which facilitates real time communication by improving performance during periods of poor connection performance between source and destination entities and recovering from said periods effectively.

In at least one aspect, the system subject technology relates to a system for digital data transfer. A source entity is configured to send a plurality of data packets at a plurality of send times separated by transmission time intervals, the data packets related to at least one type of media content. A destination entity is configured to receive the data packets at a plurality of receipt times separated by receipt time intervals. The destination entity determines whether at least one receipt time interval between data packets is less than the transmission time interval of corresponding data packets. The destination entity then plays back media content from the data packets at a dynamically varying playback speed dependent on the receipt time intervals. When the receipt time interval between the receipt times of two data packets is less than the transmission time interval between the send times of said data packets, the dynamically varying playback speed for said data packets data packets is dynamically adjusted to be faster than a nominal playback speed.

In some embodiments, the al least one type of media content is only audio. In some embodiments, the at least one type of media content includes video. In some cases, the destination entity can be configured to populate a buffer from the data packets after receipt of a first data packet of the data packets prior to a start of playback of the data packets until the buffer reaches a nominal buffer size. The destination entity can then playback data packets from the buffer when the receipt time interval is greater than the transmission time interval between two data packets. The destination entity can then populate the buffer with data packets when the buffer is not at a buffer capacity.

In some embodiments, the dynamically varying playback speed is dynamically adjusted to never exceed a set maximum playback speed. In some embodiments, when the receipt time interval between the receipt times of two data packets is less than the transmission time interval between the send times of said data packets, the destination entity is configured to determine, before dynamically adjusting the dynamically varying playback speed, if the data packets are acceptable for faster than nominal playback and dynamically adjusting the dynamically varying playback speed of said data packets according to whether the data packets are acceptable for taster than nominal playback. In some cases, when the receipt time interval between the receipt times of two data packets is less than the transmission time interval between the send times of said data packets, the destination entity is further configured to determine, before dynamically adjusting the dynamically varying playback speed, whether the data packets relate to substantially silent periods, and if so, drop the data packets related to substantially silent periods.

In at least one aspect, the subject technology relates to a method of transferring digital data. A source entity sends a plurality of data packets at a plurality of send times separated by transmission time intervals, the data packets related to at least one type of media content. A destination entity receives the data packets at a plurality of receipt times separated by receipt time intervals. The destination entity plays back media content from the data packets at a dynamically varying playback speed dependent on the receipt time intervals. When it is determined that the receipt time interval between the receipt times of two data packets is less thin the transmission time interval between the send times of said data packets, the playback speed is adjusted by dynamically varying the dynamically varying playback speed of said data packets to be faster than a nominal playback speed based. In some cases, at least one type of media content is only audio. In some cases, the at least one type of media content includes video.

In some embodiments, prior to playing back the media content and after receipt of a first data packet by the destination entity, the destination entity can populate a buffer until the buffer reaches a nominal buffer size. The destination entity can then playback data packets from the buffer when the receipt time interval between receipt times of two data packets is greater than the transmission time interval between send times of said data packets. When the buffer is not at a buffer capacity, the destination entity can populate the buffer. In some cases, the dynamically varying playback speed is dynamically adjusted to never exceed a set maximum playback speed.

In some embodiments, when the receipt time interval between the receipt times of two data packets is less than the transmission time interval between the send times of said data packets the destination entity can determine if the data packets am acceptable for faster than nominal playback. The destination entity can then dynamically adjust the dynamically varying playback speed of said data packets according to whether the data packets are acceptable for faster than nominal playback. In some cases, when the receipt time interval between the receipt times of two data packets is less than the transmission time interval between the send times of said data packets, the destination entity can determine whether said data packets relate to substantially silent periods, and if so, dropping the data packets related to substantially silent periods.

In at least one aspect, the subject technology relates to a system for digital data transfer. The system includes a source entity configured to send a plurality of data packets at a plurality of send times separated by transmission time intervals, the data packets related to at least one type of media content. A destination entity is configured to receive the data packets at a plurality of receipt times separated by receipt time intervals. Prior to playing back the media content and after receipt of a first data packet, the destination entity populates a buffer until the buffer reaches a nominal buffer size. The destination entity determines whether at least one receipt time interval between the receipt times of two data packets is less than the transmission time interval between the send times of said data packets. Media content is played back from the data packets at a dynamically varying playback speed dependent on the receipt time intervals. When the buffer is smaller than the nominal buffer size, the dynamically varying playback speed is adjusted to a slower than nominal playback speed and the buffer is repopulated. When the buffer is larger than the nominal buffer size and the receipt time interval between the receipt times of two data packets is less than the transmission time interval between the send times of said data packets, the destination entity determines if the data packets are acceptable for faster than nominal playback and if so, dynamically adjusts the dynamically varying playback speed of said data packets to a faster than nominal playback speed.

In some embodiments, the nominal buffer size dynamically changes and is based, at least in part, on the dynamically varying playback speed. In some cases, the destination entity is configured to drop data packets related to substantially silent periods when the buffer is greater than the nominal buffer size.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

The subject technology overcomes prior art problems associated playback quality due to poor connectivity within a communication system and improves playback quality. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

In general, both wired and wireless devices described herein are engineered to withstand rugged environments while still being user friendly. The high cost of rugged products can be a barrier of entry in certain markets. As such, the systems herein utilize the built in wireless capabilities of smart devices, as well as their ubiquitous nature and broad availability in today's society, in order to decrease the cost of entry for users of the system.

Figure 1:
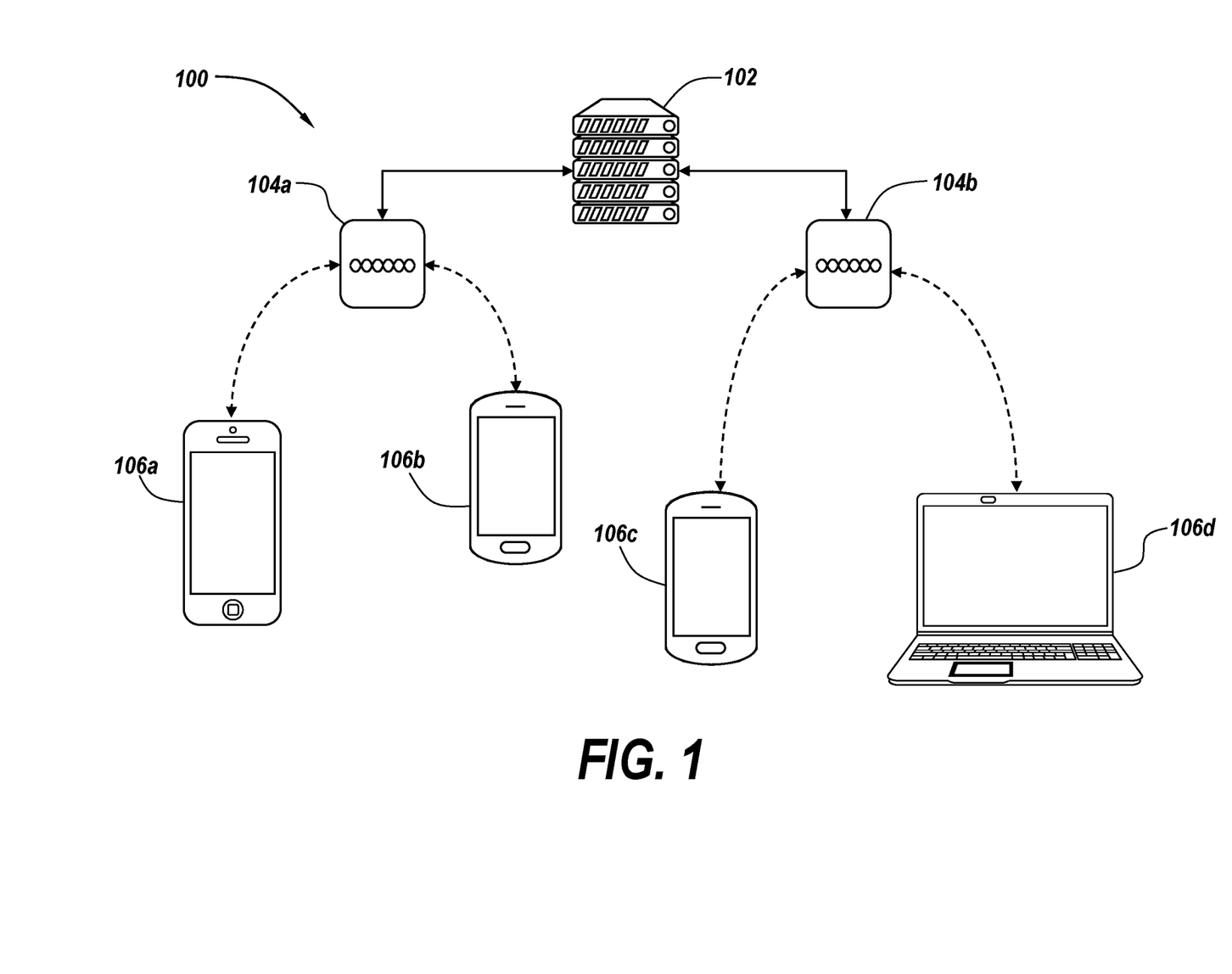
FIG. 1 is a schematic diagram of an exemplary communication system.

Referring now to FIG. 1, a schematic diagram of an exemplary system 100 which can implement the subject technology is shown. The system 100 includes a host 102, which is a server running a host application to allow wireless real-time, full duplex, multi-party, multimedia communication between communication devices. The host 102 server can be physical hardware or software based. The server manages all communication device 106a-106d (generally 106) connections and may also provide multimedia mixing. Notably, the host 102 is just one exemplary way to manage communication devices 106 and is not always a necessary component of the subject technology. Further, while various exemplary components are shown as part of the system 100, it should be understood that the subject technology is applicable in a number of substantially real-time systems which involve the transfer of data packets for audio and/or video, such as communication, streaming, gaming, and the like.

Two access points 104a, 104b (generally 104) facilitate communication between the server 102 and four communication devices 106 for carrying out a communication session. In general, the access points 104 control distribution of the data packets across the communication devices 106. The access points 104 are networking devices which connect the communication devices 106 to the host 102 server during a communication session. The access points 104 transmit and receive data to and from the communication devices 106 using a wireless local area network technology, for example WiFi 802.11 standard, and route traffic as needed utilizing specified transportation methods including IP transport.

The communication devices 104 can be any device used for communication, such as a smartphone (e.g. 106a-106c) or laptop (e.g. 106d). For example, a typical communication device 106 can be a smartphone running an iOS or Android operating system. The communication devices 106 run software which allows the communication devices 106 to connect to the system 100, provides a user interface, and allows for the transmission and receipt of multimedia data. The communication devices 106 can leave or join a given communication session on the system 100 per user demand. The number of access points 104 and communication devices 106 shown is exemplary only and it should be understood that the system 100 only requires at least one access point 104 and at least two communication devices 106 to operate.

During a given communication session, data packets containing at least one type of media content are transmitted between the devices 106. For example, the data packets can include data related to audio and/or video. At least one communication device 106 is configured to act as a source entity and send data packets. All of the communication devices 106 on the system are configured to act as destination entities and receive the data packets sent from the source entity. While the system 100 only requires one source entity, in some cases, many, or all of the communication devices 106 can be configured to act as both destination and source entities, allowing duplex communication between all of the devices 106. As an example, the communication devices 106 could include several cell phones and laptops, all of which are capable of sending and receiving audio and video between one another over the system 100. All communication devices 106 are linked up to the system 100 through a link to an access point 104, which it often wireless but can also be wired for one or more devices 106.

The system 100 can also include other equipment, not distinctly shown in FIG. 1, to enable communication between the devices 106. For example, the system 100 can include routers to allow the communication devices 106 to wirelessly connect to the host 102 via the access points 104. Data is thereby transmitted wirelessly between the access points 104 and the devices 106. The host 102 server is normally connected to the access points 104 by a physical wire. Therefore the router can translate data packets from the wired protocols to wireless, and vice versa.

The system 100 can also include a switch or a hub. If it is desirable to connect the host 102 server to existing network infrastructure, a switch allows for multiple wired connections between the host 102 and the rest of the existing infrastructure. Additionally, or alternatively, the system 100 can be connected to other systems 100, or other associated devices and systems, such as radio network layers for 2-way radio, intercom systems, and/or cellular systems.

A Dynamic Host Configuration Protocol (DHCP) server may be used to assign IP addresses to the host 102 server and connected wireless devices 106. The 802.11 WiFi standard is utilized for all wireless transmission of data, including multimedia, between the host 102 and communication devices 106. This standard is used as many existing smart devices already comply with the standard, allowing easy deployment of the system 100 as well as the ability to use off-the-shelf hardware to expand coverage of the system 100 based off of a custom application (e.g. a particular user's application). In the example of FIG. 1, the host 102 is part of a local infrastructure which the communication devices 106 connect to through access points 104. However, in other arrangements, the host 102 will contain a WiFi access point. In that case, utilization of the separate access point is optional if a WiFi infrastructure is already present, where a completely local and dedicated intercom system is desired. Notably, the physical implementation of the system 100 has many permutations. For example, the access point 104, server software, DHCP server, router, and switch could all be one piece of hardware with all the necessary software running on it, all discrete devices, or any combination within these two extremes.

In some embodiments, all communication devices 106 on the system 100 can transmit and receive on the same multicast address. Traffic from the communication devices 106 can then be routed through an access point 104 to all other communication devices 106 connected to that access point 104 without routing the traffic through a separate host 102. If communication devices 106 within the system 100 are connected to separate access points 104, the traffic between those communication devices 106 can be muted directly between the separate access points 104 to facilitate communication between the communication devices 106 connected to each access point 104. Again, the traffic need not to be muted through the host 102 between the access points 104, and can instead be muted directly between access points 104. In this approach, the host 102 need not handle all multimedia mixing. Control data packets can be sent from the host 102 to the individual communication devices 106, and each communication device 106 can handle mixing and discarding of incoming data packets at the application level of the communication device 106.

Figure 2:
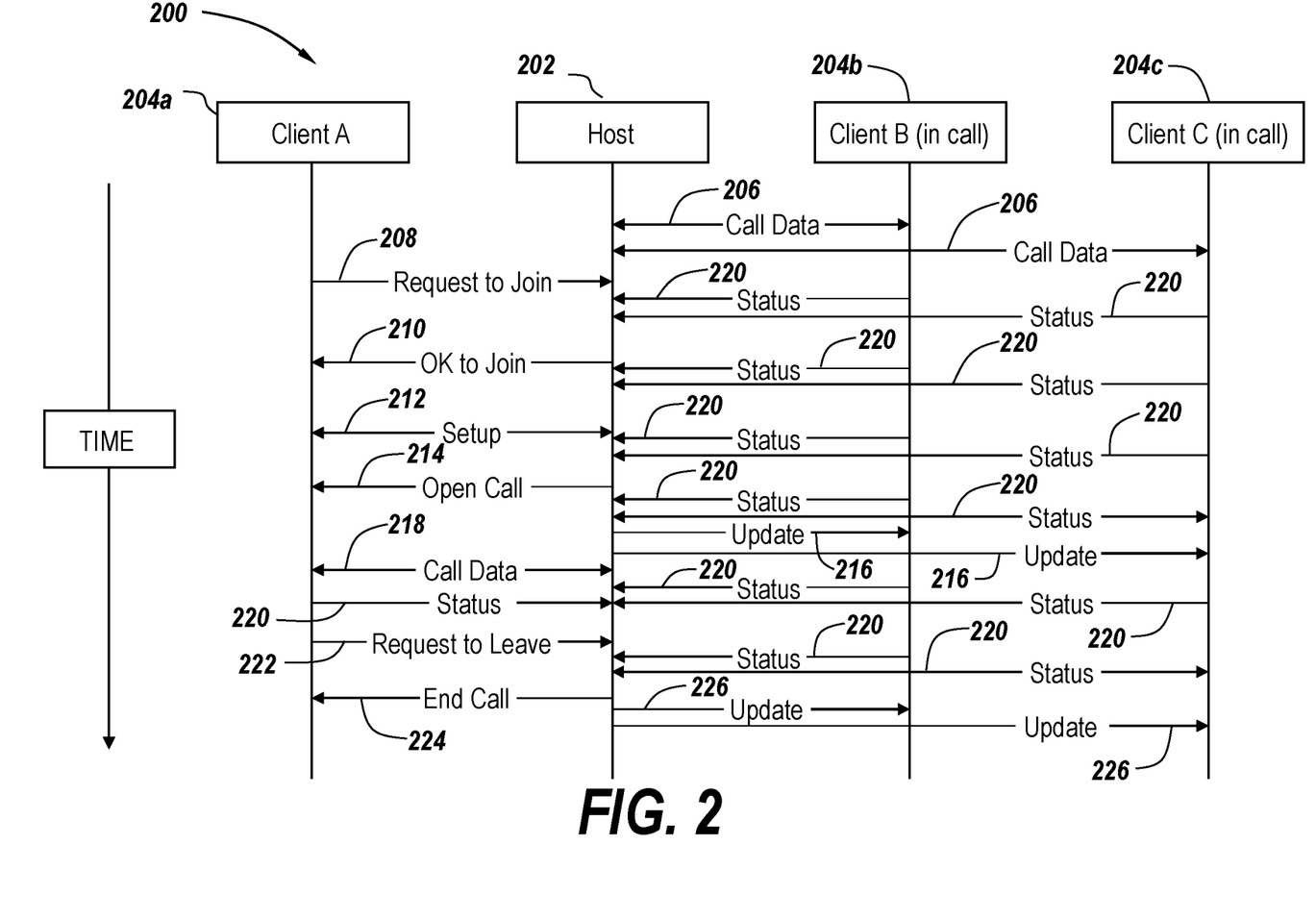
FIG. 2 is a diagram of an exemplary communication session taking place on an exemplary communication system.

Referring now to FIG. 2, an exemplary communication session is shown generally at 200. The session includes a host 202, which is in wireless communication with entities or clients 204a-204c (generally 204) which are communicating. Note that the terms entities and clients are used interchangeably with communication devices. Actions taking place during the communication session over time are represented linearly, with actions closer to the beginning of the communication session represented by the higher up lines with respect to FIG. 2. It should be understood that all times shown for actions are rough and exemplary only.

At the start of the portion of the session shown, clients 204b and 204c are already part of the communication session and communicating via the host 202. As the clients 204b and 204c communicate, data packets, including any media content being transmitted between the clients 204b, 204c, are sent to the host 202. The host 202 then mixes the data for the clients 204b, 204c which are part of the communication session and sends out a (generally multicast) stream to clients 204b, 204c that have joined the session. To that end, clients 204b and 204c are exchanging call data 206 with the host 202. For ease of illustration, this is shown at slightly different times, but it should be understood both clients 204*b*, 204*c* will continue to transmit call data, after joining, over the course of the communication session unless they leave.

Initially, client 204*a* has not joined the session and is not communicating with the other clients 204*b*, 204*c*. New clients that are wirelessly connected to the system, such as client 204*a* may also join a communication session at any time. Clients that are part of a call session, such as clients 204*b* and 204*c*, may also leave at any time. Clients joining or leaving a call session does not disrupt the system.

Client 204*a* eventually requests to join the communication session at line 208. Client 204*a* receives confirmation that it is cleared to join the session at line 210. Line 212 represents setup data being exchanged between the host 202 and the client 204*a*, and then a call is opened with client 204*a* (line 214) which becomes a part of the communication session. The host 202 handles all of the initial back and forth relating to call setup. RTP and RTCP protocols can be used at the Application layer (i.e. of the OSI network) to manage the session and the data transmitted over the system. Clients 204*b* and 204*c* are then updated, at line 216, to reflect that client 204*a* is part of the communication session. Client 204*a* can then send and receive data packets over the system during the communication session (line 218).

Periodically, status packets are also transmitted between the clients 204 within the communication session and the host 202 (represented by lines 220). The status packets can include control traffic relating to communication metrics of the system (e.g. control information) and can be relied upon to measure system performance. An exemplary status packet can include, for example, a packet ID number, the number of the last packet sent, an access point MAC address, and GPS coordinates (if available). Eventually, client 204*a* decides to leave the system and a request to leave is sent to the host 202 at line 222. The host 202 then removes client 204*a* from the communication session at line 224. Clients 204*b* and 204*c* are then updated, at lines 226, that client 204*a* has left the session. In this way, a communication session is carried out over the system.

Since the communication session is taking place in real time, problems can arise when one client 204 has a poor connection with the system. For example, if client 204*a* transmits data packets and client 204*b* has a poor connection, the poor connection of client 204*b* can disrupt distribution of data packets by the system, as the system tries repeatedly to transfer data patents to client 204*b*. As described in more detail below, the subject technology seeks to optimize the performance of the system with respect to these issues.

Figure 3:
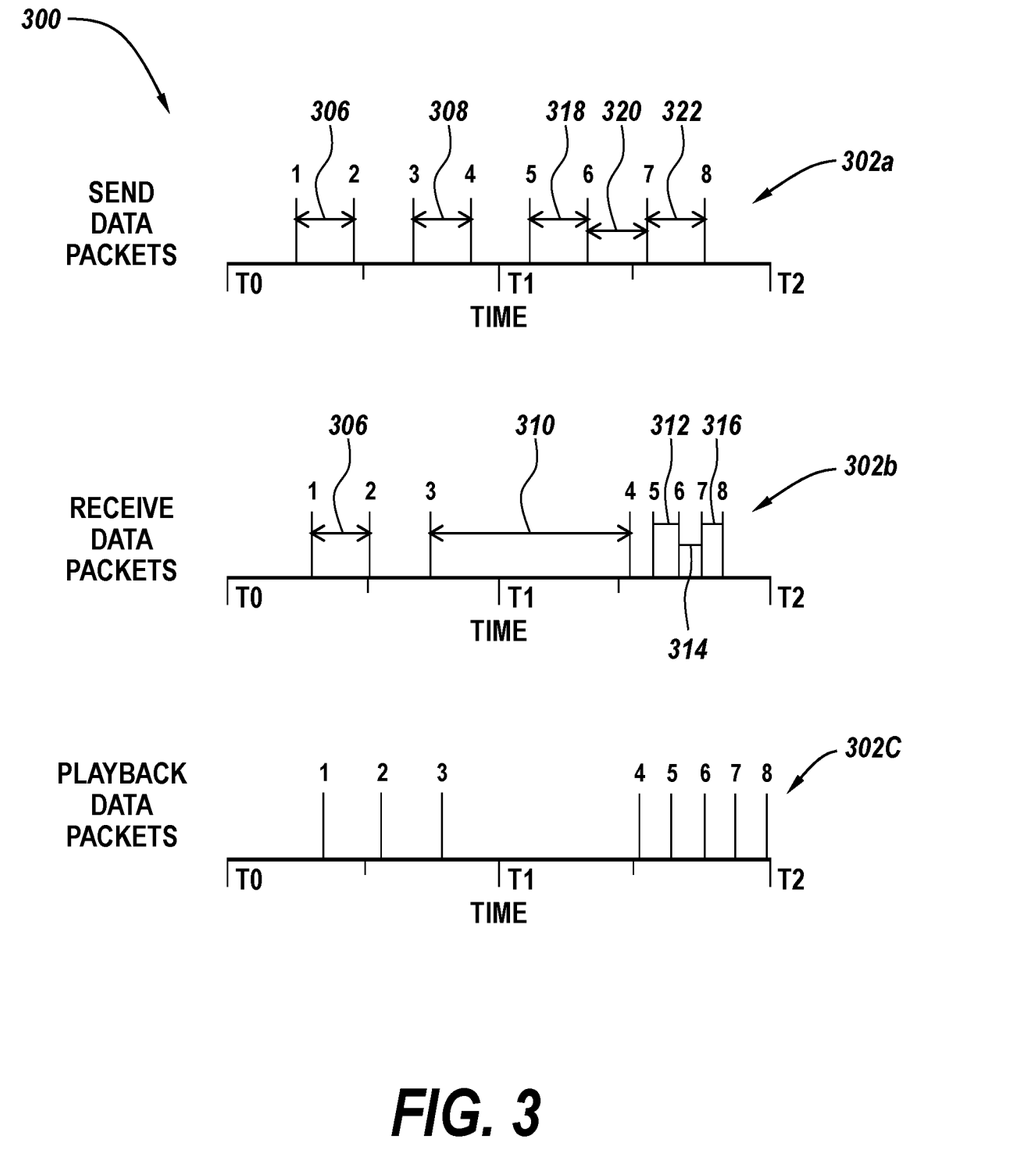
FIG. 3 shows exemplary timelines of digital data transfer and playback in accordance with the subject technology.

Referring now to FIG. 3, timelines of digital data transfer and playback over time in accordance with the subject technology is shown generally at 300. The digital data transfer can be carried out using the systems and related components described above. Data packets 1-8 contain data related to media content and are shown at different locations across timelines 302*a*, 302*b*, 302*e* (generally 302). The timelines 302 are not meant to represent a time period of any specific length and are instead used herein to describe the relative times of certain actions related to the data packets 1-8. The uppermost timeline 302*a* represents the timeline of data packets 1-8 being sent by a source entity, with each data packet 1-8 being positioned along the timeline 302*a* according to a transmission time. The time period along the timeline 302*a* between transmission times of any two data packets 1-8 is referred to as the transmission time interval between those data packets 1-8. The middle timeline 302*b* represents the timeline of data packets 1-8 being received by a destination entity (after transmission per timeline 302*a*), with each data packet 1-8 being positioned along the timeline 302*b* according to a receipt time. The time period along the timeline 302*b* between receipt times of any two data packets 1-8 is referred to as the receipt time interval between those data packets 1-8. The bottom timeline 302*c* represents the timeline of media content from the data packets 1-8 being played back by a destination entity, with each data packet 1-8 being positioned along the timeline 302*c* according to a playback time. The timelines 302 are exemplary of one transmission and playback cycle of a group of data packets 1-8.

In the example shown in FIG. 3, the data packets 1-8 are all transmitted by a source entity at send time separated by transmission time intervals that are substantially uniform. This is because these transmission time intervals represent the time interval during which a data packet is generated since they typically include media content of real time communications. Thus, a substantially constant amount of time passes between send times of data packets during a given transmission cycle from the source entity. The data packets 1-8 are transmitted, generally, without consideration on how or if the data packets 1-8 are being received. In this way, the source entity continues to transmit data packets 1-8 from the source entity as real time media content is generated at the source entity, without regard to the rest of the system. If the data packets 1-8 are being transmitted in relation to a communication session, for example, the data packets generally will relate to any audio (or video) transmitted from the user of the source entity. There may also be times where the user of the source entity pauses in speaking (or sending video) during the session. In that case, one or more data packets may be substantially silent, in that they contain no media content (e.g. audio or video) to transfer. The system can also be configured to identify when the only media content within the data packets 1-8 is background noise, data packets 1-8 with only background noise being considered substantially silent periods. Often, these data packets 1-8 are still sent at the transmission stage, but can be addressed at the playback stage, as discussed in more detail below. Transmission of data packets 1-8 from the source entity can last for a fixed amount of time while the source entity activates a button or control (i.e. push-to-talk button), or even for the entire duration that the source entity is engaged as part of a communication session. The transmission of 8 data packets 1-8 is given only by way of example, and for explanation of various features of the subject technology.

A destination entity that is part of a communication session with the source entity receives the data packets 1-8 at some time after they are sent. In practice, some data packets may also be lost, although that is not shown specifically herein. While some data packets are received substantially immediately after being sent, receipt of other data packets is delayed for some time. One factor which can affect the receipt times is the connection between the source and destination entities, which can fluctuate periodically over the time period of a given communication session. A poor connection between source and destination results in a delay between the send and receive times of data packets.

For example, data packets 1 and 2 are transmitted during a time where the connection between communication devices is good and the data packets 1, 2 are received almost immediately after they are sent, resulting in a the receipt time interval between 304 the data packets 1, 2 that is substantially the same as the transmission time interval 306.

By contrast, when the source entity sends data packet 4 a poor connection between the source entity and destination entity exists, resulting in a significant time period elapsing before the data packet 4 is received. As such, while the transmission time interval 308 between send times of data packet 3 and data packet 4 remains constant, the transmission time interval 308 is much less than the resulting receipt time interval 310 between receipt times of data packet 3 and data packet 4. By the time a good connection is restored such that the data packet 4 is received, data packets 5 and 6 have already been sent and the system has become backed up, with many data packets being sent during the time period of the poor connectivity without any data packets being received. Typically, the source entity will be alerted that the data packets 5-6 were not successfully delivered during this time of poor connectivity and will continue to attempt to retransmit these data packets 5-6 such that they can be delivered once the connection is restored.

It should be understood that multiple destination entities can also be used in a given system, and as part of a given communication session. In that case, all destination entities can be receiving the data packets, potentially at different receipt times, and utilizing different playback schemes in accordance with the subject technology discussed herein.

As it receives the data packets 1-8, the destination entity has to determine the speed at Which to playback the media content contained on the data packets 1-8 to the user. In an ideal scenario with a strong connection between source entity and destination entity and no other obstacles to transmission or processing, data packets 1-8 would be received very soon alter being sent and would be played by the destination entity soon after receipt, in some cases after a brief buffer period. In this scenario, where the connection is good, the destination entity plays back the media content on the data packets 1-8 at a nominal playback speed similar to the speed at which the data packets 1-8 are being generated and transmitted. In such a case, there would be similar time periods between the send times and playback times of data packets 1-8.

However, in practice, this ideal scenario is not always the case. The path between the source entity and destination entity can sometimes be impaired and poor connectivity between the source and destination can cause data packets to backup and not be received by the destination entity for some time period. The data packets will then be received in quick succession once the connection is improved. Therefore, in accordance with the subject technology, playback times are dynamically adjusted along the playback timeline 302c to account for an impaired transmission between source and destination entities.

In general, over the course of the transmission of a small group of data packets, the transmission time tends to be a set constant rate, making the transmission tittle intervals relatively even. This is exemplified by the uniform transmission time intervals between data packets 1-8 on timeline 302a. Once the destination receives a data packet after an inordinately large receipt time interval (e.g. receipt time interval 310), it is likely a connection problem has occurred. For example, it can be seen by comparing timeline 302a and 302b that the elapsed time between transmission time and receipt of data of data packet 1 is very small (exemplifying a good connection) while the elapsed time between transmission and receipt time of data packet 4 is much larger. Once the connection is reestablished and data packet 4 is received, several data packets 5-8 are received in more rapid succession. This results in the receipt time intervals 312, 314, 316 between the data packets 5-8 being less than the transmission time intervals 318, 320, 322 between respective data packets 5-8, as the system receives numerous previously generated and transmitted data packets 5-8, the attempted transmission of which has continued throughout the period of poor connectivity. During the time period that data packets 5-8 are received, playback is behind since newly received data packets of current communication at the source entity are queued for playback behind all previous data packets which have not yet been played back. To catchup, the destination entity dynamically adjusts the playback speed to be faster than the nominal playback speed. Therefore data packets 4-7 are played back more quickly such that playback of each subsequent data packet can be started sooner and the system can catch back up and play more current data packets.

In some cases, when and how the destination entity dynamically adjusts the playback speed can be further based on the contents of the data packets. In this approach, the destination entity (or other device within the system) needs to do some analysis of the contents of the data packets. This can occur at the destination entity once the data packets are received. After this analysis, the destination entity can classify the data packets by content to determine whether they are acceptable for faster than nominal playback. In general, this could be application dependent or independent. For example, an application independent mechanism may look at the queue depth at the receiver and then trigger faster than normal playback. In another example, low value content, such as advertisements or promotions in a video stream may be accelerated. After the data packets are analyzed, the destination entity can also determine that some data packets are non-integral to the communication session and can be dropped entirely. Data packets related to substantially silent periods (i.e. little to no substantive media content and/or just background noise), for example, can be dropped entirely, particularly after the destination entity has fallen behind in receipt of data packets and it is advantageous to speed up playback to catch up. While it is generally advantageous to speed up playback when the destination entity needs to catch up, the destination entity can also incorporate a set maximum playback speed which the dynamically varying playback speed will not exceed. Setting a maximum playback speed can ensure smooth and clear communication for a given application or environment, even as the destination entity seeks to catch up. This set maximum playback speed can be predetermined by a user based on a particular application, or can just be a preset speed at the destination entity applications.

In some situations, a buffer can also be included, and the dynamic adjustments to playback speed can be based in part on the current buffer size. For example, referring now to FIG. 4 graphs of digital data transfer and playback incorporating a buffer in accordance with the subject technology are shown generally at 400. Notably, the timelines 302a, 302b for data send and receipt times respectively remain unchanged from FIG. 3. However, a buffer is incorporated in playback of the data packets, which is reflected by the changed playback timeline 402c.

Figure 4:
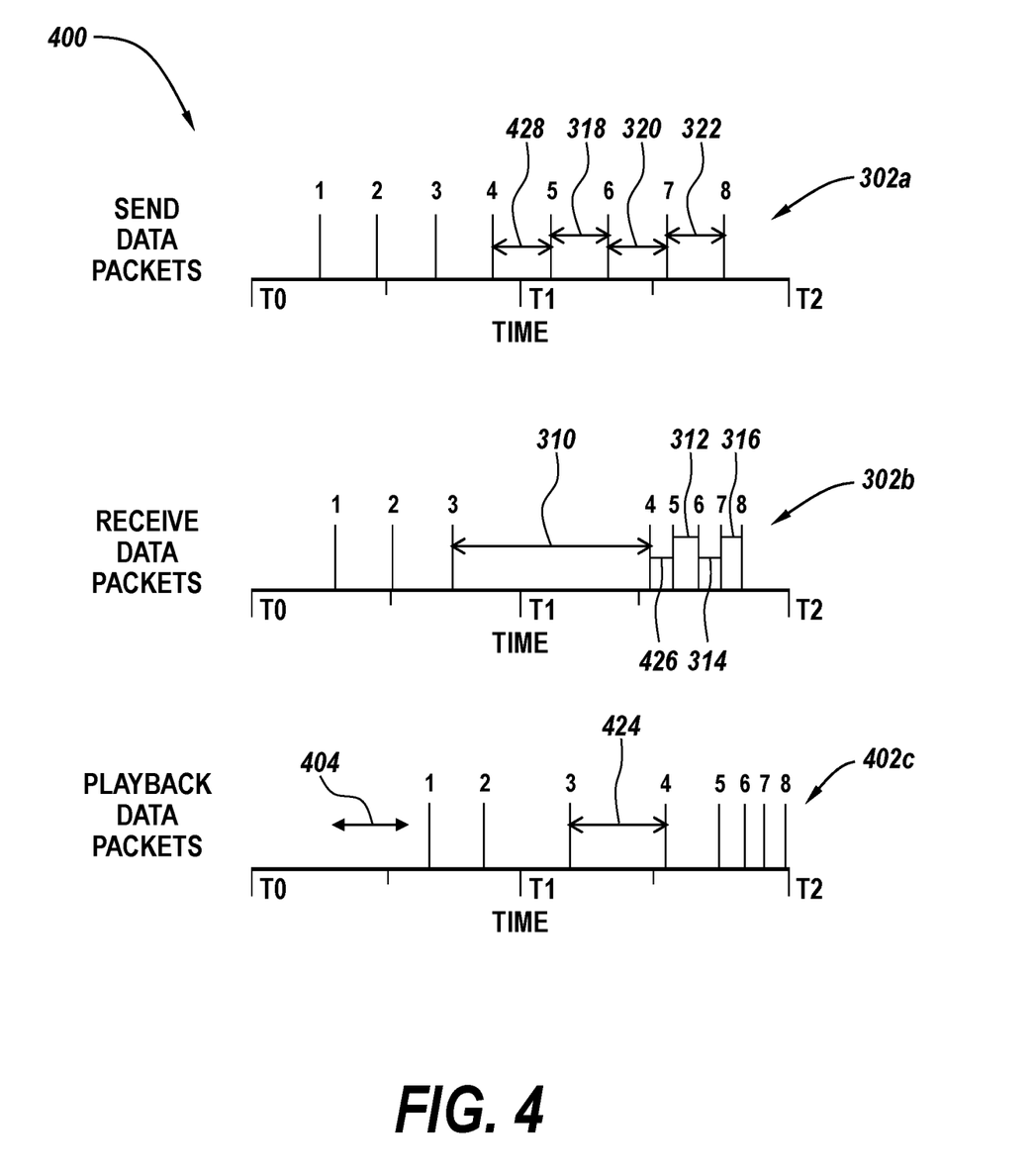
FIG. 4 shows exemplary timelines of digital data transfer and playback in accordance with the subject technology.

As such, before any playback starts, an initial buffer time period 404 is allowed to pass as the buffer is initially populated to a nominal buffer size. In FIG. 4, the buffer reaches the nominal buffer size after data packets 1-2 have been received, but this particular number of data packets is used tar explanatory purposes only and the nominal buffer size can be set, as desired, for different applications. In some cases, the nominal buffer size can also dynamically change. The nominal buffer size can be tied to the current playback rate, changing based on the playback rate as the playback rate is dynamically adjusted. After the buffer reaches the nominal size, playback of the data packets 1-8 occurs, starting with data packet 1. However, as mentioned above with respect to FIG. 3, after receipt of data packet 3, the source and destination entity experience a poor connection and no new transmitted data packets are received by the destination entity over the receipt time interval 310. Therefore playback by the destination entity starts utilizing data packet packets within the buffer, without the ability to repopulate the buffer since no new data packets are received. During this process, the buffer will fall below the nominal buffer size. When the buffer falls below the nominal buffer size, the destination entity will temporarily slowdown the playback speed to a slower than nominal rate, as indicated by the time interval 424 passing between the start of playback of data packets 3-4. Slowing down the playback speed at this time preserves the buffer as long as possible to avoid a potential situation where the buffer is completely empty and no data packets are available for playback at the destination entity, resulting in an interruption of the playback stream.

Eventually, new data packets 5-6 are received before the playback of data packet 4 has completed at the slower than nominal rate. After receipt of data packet 6, the buffer has repopulated and is again larger than the nominal buffer size. As can be seen through the time intervals 312, 314, 316, 426 between receipt times of data packets 4-8, the destination entity has fallen behind and needs to catch back up once the buffer has been restored. Since the receipt time intervals 318, 320, 323, 428 are now much shorter than the transmission time intervals 312, 314, 316, 426, and the buffer is larger than the nominal size, the destination entity is now in a position where it can effectively dynamically adjust the playback speed to a faster than nominal playback speed to catch up with the transmissions from the source entity. Therefore after receipt of data packet 6, and restoration of the buffer to above the nominal size, the destination entity can first analyze the content of the data packets (if desired). If the destination entity determines the data packets, such as data packets 6-8, are of a type that are acceptable for faster playback, then the playback rate can be dynamically adjusted to play those data packets 6-8 back at a faster than nominal rate. Additionally, during the process of analyzing the data packets, the destination entity can also selectively decide to drop one or more non-integral data packets to help the system catch up, such as data packets related to substantially silent periods. This allows the destination entity to playback the queued packets (which were received late) far the user without having a serious detriment to quality. In this way, the system can facilitate smooth communication during periods of poor connectivity between source and destination entities, while also recovering during periods of good connectivity without sacrificing the quality of the playback.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g. servers, communication devices, etc.) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed. Additionally, the subject technology includes methods of carrying out the functions of the system as described herein.

What is claimed is:

1. A system for digital data transfer comprising:
a source entity configured to send a plurality of data packets at a plurality of send times separated by transmission time intervals, the data packets related to at least one type of media content; and
a destination entity configured to:
receive the data packets at a plurality of receipt times separated by receipt time intervals;
determine whether at least one receipt time interval between data packets is less than the transmission time interval of corresponding data packets; and
playback media content from the data packets at a dynamically varying playback speed dependent on the receipt time intervals,
wherein, when the receipt time interval between the receipt times of two data packets is less than the transmission time interval between the send times of said data packets, the dynamically varying playback speed for said data packets is dynamically adjusted to be faster than a nominal playback speed.

2. The system of claim 1, wherein the at least one type of media content is only audio.

3. The system of claim 1, wherein the at least one type of media content includes video.

4. The system of claim 1, wherein the destination entity is further configured to:
populate a buffer from the data packets after receipt of a first data packet of the data packets prior to a start of playback of the data packets until the buffer reaches a nominal buffer size;
playback data packets from the buffer when the receipt time interval is greater than the transmission time interval between two data packets; and
populate the buffer with data packets when the buffer is not at a buffer capacity.

5. The system of claim 1, wherein the dynamically varying playback speed is dynamically adjusted to never exceed a set maximum playback speed.

6. The system of claim 1, wherein:
when the receipt time interval between the receipt times of two data packets is less than the transmission time interval between the send times of said data packets, the destination entity is further configured to determine, before dynamically adjusting the dynamically varying playback speed, if the data packets are acceptable for faster than nominal playback and dynamically adjusting the dynamically varying playback speed of said data packets according to whether the data packets are acceptable for faster than nominal playback.

7. The system of claim 6, wherein:
when the receipt time interval between the receipt times of two data packets is less than the transmission time interval between the send times of said data packets, the destination entity is further configured to determine, before dynamically adjusting the dynamically varying playback speed, whether the data packets relate to substantially silent periods, and if so, drop the data packets related to substantially silent periods.

8. A method of transferring digital data comprising:
sending, by a source entity, a plurality of data packets at a plurality of send times separated by transmission time intervals, the data packets related to at least one type of media content;
receiving, by a destination entity, the data packets at a plurality of receipt times separated by receipt time intervals;
playing back media content from the data packets, by the destination entity, at a dynamically varying playback speed dependent on the receipt time intervals; and
determining when the receipt time interval between the receipt times of two data packets is less than the transmission time interval between the send times of said data packets and dynamically adjusting the dynamically varying playback speed of said data packets to be faster than a nominal playback speed.

9. The method of claim 8, wherein the at least one type of media content is only audio.

10. The method of claim 8, wherein the at least one type of media content includes video.

11. The method of claim 8, further comprising:
prior to playing back the media content and after receipt of a first data packet by the destination entity, populate, by the destination entity, a buffer until the buffer reaches a nominal buffer size;
playback, by the destination entity, data packets from the buffer when the receipt time interval between receipt times of two data packets is greater than the transmission time interval between send times of said data packets; and
populate the buffer, by the destination entity, with data packets when the buffer is not at a buffer capacity.

12. The method of claim 8, wherein the dynamically varying playback speed is dynamically adjusted to never exceed a set maximum playback speed.

13. The method of claim 8, further comprising:
when the receipt time interval between the receipt times of two data packets is less than the transmission time interval between the send times of said data packets, determining, by the destination entity, if said data packets are acceptable for faster than nominal playback and dynamically adjusting the dynamically varying playback speed of said data packets according to whether said data packets are acceptable for faster than nominal playback.

14. The method of claim 13, further comprising:
when the receipt time interval between the receipt times of two data packets is less than the transmission time interval between the send times of said data packets, determining, by the destination entity, whether said data packets relate to substantially silent periods, and if so, dropping data packets related to substantially silent periods.

15. A system for digital data transfer comprising:
a source entity configured to send a plurality of data packets at a plurality of send times separated by transmission time intervals, the data packets related to at least one type of media content; and
a destination entity configured to:
receive the data packets at a plurality of receipt times separated by receipt time intervals;
prior to playing back the media content and after receipt of a first data packet, populate a buffer until the buffer reaches a nominal buffer size;
determine whether at least one receipt time interval between the receipt times of two data packets is less than the transmission time interval between the send times of said data packets; and
playback media content from the data packets at a dynamically varying playback speed dependent on the receipt time intervals,
wherein:
when the buffer is smaller than the nominal buffer size, adjust the dynamically varying playback speed to a slower than nominal playback speed and repopulate the buffer; and
when the buffer is larger than the nominal buffer size and the receipt time interval between the receipt times of two data packets is less than the transmission time interval between the send times of said data packets, the destination entity determines if the data packets are acceptable for faster than nominal playback and if so, dynamically adjusts the dynamically varying playback speed of said data packets to a faster than nominal playback speed.

16. The system of claim 15, wherein the nominal buffer size dynamically changes and is based, at least in part, on the dynamically varying playback speed.

17. The system of claim 15, wherein the destination entity is configured to drop data packets related to substantially silent periods when the buffer is greater than the nominal buffer size.

* * * * *